Patented Dec. 23, 1947

2,432,991

UNITED STATES PATENT OFFICE 2,432,991

ACYLATION OF THIOPHENE

Howard D. Hartough, Pitman, and John J. Sardella, Woodbury, N. J., assignors to Socony-Vacuum Oil Company, Incorporated, a corporation of New York No Drawing. Application January 18, 1946, Serial No. 642,113

12 Claims. (Cl. 260—329)

This invention relates to a catalytic acylation process for thiophenes and, more particularly, is directed to a method for acylating thiophene and its derivatives in the presence of glauconite as a catalyst.

The acylation of thiophene and thiophene derivatives has previously been carried out employing organic acid anhydrides, acyl halides, and acyl nitriles as acylating agents and in the presence of various catalysts, including aluminum chloride, stannic chloride, titanium tetrachloride, phosphorus pentoxide and 2-chloromercurithiophene. Other methods of making acylated thiophene include the dry distillation of calcium salts of thiophene carboxylic acids and the action of nitriles on thienylmagnesium iodide.

Of these processes, the catalytic methods employing Friedel-Crafts type catalyst, such as aluminum chloride, stannic chloride, titanium tetrachloride and the like, have been used most extensively. These catalysts, although applicable with considerable success in the acylation of aromatic hydrocarbons, are only moderately successful where thiophene is involved. This appears to be due to the relative instability of the thiophene ring; the Friedel-Crafts catalyst, for example aluminum chloride, attacking the sulfur and causing many undesirable secondary reactions with concomitantly low yields of acyl thiophenes. Furthermore, compounds such as aluminum chloride form addition complexes with the carbonyl group of the resulting ketone, substantially decreasing the yield of desired product and requiring a considerable excess of aluminum chloride over the theoretical amount required for the acylation process. Thus, when aluminum chloride is used as the condensing agent, the mole ratio of catalyst to acyl chloride or acyl nitrile is at least one and, in the case of acid anhydrides, at least two. Likewise, other Friedel-Crafts catalysts, such as stannic chloride, must be used in molecular quantities with respect to the acyl halide being employed in the acylation of thiophene. This is probably due to the fact that acyl halides form comparatively stable molecular complexes with aluminum chloride and stannic chloride, thereby diminishing their catalytic effect.

Moreover, the use of aluminum chloride in the acylation of thiophene entails strict observance of detail in experimental observations. Thus, it is known that thiophene and aluminum chloride react vigorously in carbon disulfide suspension. It has been reported that a moderately good yield of phenylthienyl ketone is obtained by adding a solution of benzoyl chloride and thiophene in carbon disulfide to a suspension of aluminum chloride in the same solvent. If, however, a carbon disulfide solution of the acid chloride was added to a suspension of thiophene and aluminum chloride, much tar was formed and a low yield of ketone resulted. The acylation of thiophene has, accordingly, been an exceedingly difficult reaction to carry out, the usual acylation catalysts causing excessive resinification of the thiophene reactant. The resinification usually occurs before acylation can be effected, and if the expected reaction product is formed, it is generally only in relatively small amounts.

It has now been discovered that acylated thiophenes may be obtained in an efficient manner by reacting thiophene or thiophene derivatives with an acylating agent in the presence of a small amount of glauconite. It has been found that by using glauconite as a catalyst, the above-mentioned difficulties encountered in the acylation of thiophene have largely been overcome. Thus, by employing a catalyst of glauconite, the undue resinification and formation of addition complexes formerly encountered in the catalytic acylation of thiophene have been substantially eliminated, the products resulting being almost entirely acyl thiophenes having one or more side chains corresponding to that of the acylating agent. It has been found, in accordance with this invention, that glauconite effects the acylation of thiophene smoothly and specifically in contrast to the more conventional catalysts employed heretofore, giving a substantial yield of desired ketone without accompanying formation of complex addition products and resinification. The acylation of thiophenes using glauconite as a catalyst, moreover, can be carried out in a direct manner without a detailed observance of experimental conditions, such as is a necessary precaution to be taken when aluminum chloride is employed as catalyst.

It is, accordingly, an object of the present invention to provide an efficient process for synthesizing acylated thiophenes. Another object is to provide a process for catalytically acylating thiophene and its derivatives. A still further object is to afford a process for catalytically acylating thiophene in a relatively simple and direct manner which can be easily carried out by using an inexpensive, easily obtainable catalyst. A very important object is to provide a process capable of reacting thiophene or its derivatives with an acylating agent in the presence of an efficient catalyst without undue formation of addition complexes between the catalyst and thiophene or between the catalyst and acylating agent.

These and other objects which will be recognized by those skilled in the art are attained in accordance with the present invention, wherein thiophene or its derivatives are acylated by reaction with organic carboxylic acid anhydrides or acyl halides in the presence of glauconite as a catalyst.

Glauconite, also referred to as greensand, is well known to the art as a water softener wherein it plays the role of an ion exchanger. It is a naturally occurring deposit found in various localities. Its exact composition, of course, will be dependent upon the area in which it is found. In general, the oxides of aluminum, silicon, iron, potassium and magnesium will comprise the larger portion of the composition of glauconite employed in the process of the present invention. The use of sands containing major amounts of the alkaline earth metals such as calcium should be avoided, since samples containing relatively large quantities of calcium have been found to have little catalytic effect in promoting the acylation of thiophene. The composition of glauconite may generally be defined as follows:

|  | Per cent composition |
|---|---|
| $SiO_2$ | 40.00 to 53.61 |
| $Al_2O_3$ | 6.62 to 13.00 |
| $Fe_2O_3$ | 15.16 to 23.43 |
| $FeO$ | 1.32 to 10.17 |
| $MgO$ | 0.95 to 2.97 |
| $CaO$ | 0.57 to 1.97 |
| $Na_2O$ | 0.42 to 2.16 |
| $K_2O$ | 3.49 to 9.54 |
| $H_2O$ | 4.93 to 10.32 |

It may be used in accordance with the present invention upon mere drying to remove adhering surface water or may be activated by acid treatment and heating at an elevated temperature. A catalyst which had been activated by the latter treatment was found to give a higher yield of acylated thiophene. Glauconite is employed in the process of this invention in a finely divided form and in amounts between about 4 and about 25 per cent, based on the weight of the reactants.

The acylating agents to be used herein may be an organic carboxylic acid or an acyl halide. Included in the former category are compounds such as the ketenes, having the basic structure

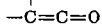

and which yield carboxylic acids upon contact with water. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be employed.

Thiophene or derivatives of thiophene having one or more substituent groups, such as halogen, alkyl, aryl, or alkoxy groups attached to the thiophene ring, may be acylated in accordance with this invention. The 2- and 5-positions in the thiophene ring, being adjacent to the sulfur atom, are generally much more reactive than the 3- and 4-positions and, in acylating thiophene, the entering acyl group will preferably attach itself to the carbon atom adjacent to the sulfur. When the 2-position of the thiophene ring is already occupied by a substituent group or atom, the entering acyl group will preferably attach itself to the 5-position. When the 3-position is occupied, the acyl substituent will enter for the most part at the 2-position. However, in some instances, a small portion of the 3,5-product may be obtained. Thiophene derivatives having substituents of a highly negative character, such as carbonyl, ester, nitro and cyano groups, and no activating substituent, such as a hydroxy or alkoxy group, do not acylate readily. These groups, commonly referred to as meta-directing, possess a highly electronegative character which tends to inhibit the acylation reaction.

The acylation of thiophene or its derivatives is carried out, in accordance with the process of this invention, by employing substantially equimolar quantities of thiophene and acylating agent. An excess of either of the reactants, as will be shown hereinafter, does not appear to appreciably affect the yield of acylated thiophene. The upper limit of temperature at which the process is carried out will be dependent upon the boiling point of the reactants at the specific pressure of the reaction. In general, temperatures between about 80° C. and about 150° C. and pressures between atmospheric and about six atmospheres have been found satisfactory for effecting the acylation reaction. The effect of increased pressure, theoretically, is toward increased reaction but, from a practical standpoint, this is not a very great effect with reactions such as those involved herein, which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time that may be needed. It is, of course, to be understood that these reaction variables are more or less interdependent. Under the conditions encountered in the process of this invention, however, the reaction period will generally vary from about 1 to about 10 hours.

Acylated thiophenes produced in accordance with this invention are useful as solvents, dye intermediates, addition agents for petroleum fractions, plasticizers, odorants, perfume diluents, resin intermediates and intermediates for chemical synthesis. Long chain alkyl thienyl ketones may also find uses as synthetic lubricants, waxes, extreme pressure additives for mineral oils and anti-foaming agents.

The following examples will serve to illustrate the process of this invention without limiting the same:

*Example 1*

To a mixture of 84 grams (1 mole) of thiophene and 107 grams (1 mole) of 95% acetic anhydride were added 25 grams of raw glauconite previously dried at 100° C. to remove surface water. The mixture was heated to a reflux for a period of 5 hours, the temperature progressively rising from 104° to 124° C. At the end of this time, the reaction mixture was cooled and the glauconite removed by filtration. The catalyst was washed with 50 milliliters of chloroform and the resultant washings and filtrate were transferred to a still where chloroform, unreacted thiophene, acetic acid, and unreacted acetic anhydride were distilled off at atmospheric pressure. The still was then placed under vacuum and 57 grams of 2-acetylthiophene, having a boiling point of 85–88° C. at 8 millimeters pressure, were obtained. This represents a 45 per cent conversion to the ketone.

*Example 2*

To a mixture of 84 grams (1 mole) of thiophene and 321 grams (3 moles) of 95 per cent acetic anhydride were added 20 grams of raw glauconite previously dried at 100° C. to remove surface water. The mixture was heated to a reflux over a period of 4¼ hours, the temperature progressively rising from 115° C. to 128° C. The reaction mixture was then cooled and the glauconite removed by filtration. The catalyst was washed with 100 milliliters of chloroform. The resultant washings and filtrate were transferred to a still where chloroform, unreacted thiophene, acetic acid, and unreacted acetic anhydride were removed in order at atmospheric pressure. The still was then placed under vacuum and 63 grams of 2-acetylthiophene were obtained upon distillation. This represents a 50 per cent conversion to the ketone.

*Example 3*

To a mixture of 252 grams (3 moles) of thiophene and 107 grams (1 mole) of 95 per cent acetic anhydride were added 20 grams of raw, dried glauconite. The mixture was heated to reflux over a period of 6 hours, the temperature progressively rising from 87° C. to 95° C. The reaction mixture was then cooled and the glauconite removed by filtration. The catalyst was washed with chloroform and the washings and filtrate were distilled, yielding 63 grams of 2-acetylthiophene. This represents a 50 per cent conversion to the ketone.

*Example 4*

To a mixture of 168 grams of thiophene (2 moles) and 140 grams of benzoyl chloride (1 mole) were added 20 grams of raw, dried glauconite. The mixture was heated to reflux over a period of 4¼ hours, the temperature progressively rising from 85° C. to 108.5° C. The reaction mixture was then cooled, filtered, and the glauconite washed with 150 cubic centimeters of benzene. The mixture of resultant washings and filtrate was treated with 100 cubic centimeters of 15 per cent potassium hydroxide solution to neutralize any unreacted benzoyl chloride. The mixture was then transferred to a separatory funnel, the potassium hydroxide layer removed, and the remaining layer was transferred to a steam bath, where benzene was evaporated. 177 grams of crude product (94 per cent yield) were obtained. The crude product was then vacuum-distilled and 145 grams of benzothienone, having a boiling point of 143–144° C. at 3 millimeters pressure, were obtained. This represents a 77 per cent yield of purified product.

*Example 5*

To a mixture of 84 grams (1 mole) of thiophene and 107 grams (1 mole) of 95 per cent acetic anhydride were added 50 grams of raw, dried glauconite. The reaction procedure of Example 1 was followed and 92 grams of 2-acetylthiophene, representing a 73 per cent conversion, were obtained.

*Example 6*

To a mixture of 84 grams (1 mole) of thiophene and 107 grams (1 mole) of 95 per cent acetic anhydride were added 25 grams of activated glauconite. The activation of glauconite was carried out by treating 589 parts by weight of dried glauconite with 1800 parts by weight of distilled water, 120 parts by weight of concentrated sulfuric acid and 120 parts by weight of ferrous sulfate, and agitating the mixture at 80° C. for five hours. The mixture at the end of this period was allowed to settle and the water layer decanted. The catalyst was then stirred with water, transferred to a filter and washed with distilled water until the filtrate was free of acid.

The mixture of thiophene, acetic anhydride, and activated glauconite was refluxed for 5 hours, the temperature progressively rising from 105° C. to 123° C. The reaction mixture was then treated as in Example 1 and 82 grams (66 per cent conversion) of 2-acetylthiophene were obtained.

From the above examples, it will be evident that glauconite, either in its naturally occurring state or activated by acid treatment, is an effective, inexpensive catalyst for promoting the acylation of thiophenes. In the light of the prior art, the present invention is to be given a broad interpretation and is not to be unduly limited except as hereinafter defined by the appended claims.

We claim:

1. A process for nuclear acylation of a thiophene comprising reacting a thiophene with an acylating agent selected from the group consisting of acyl halides and anhydrides of carboxylic acids in the presence of glauconite as a catalyst.

2. A process for nuclear acylation of a thiophene comprising reacting a thiophene with an acylating agent selected from the group consisting of acyl halides and anhydrides of carboxylic acids in the presence of naturally occurring glauconite as a catalyst.

3. A process for nuclear acylation of a thiophene comprising reacting a thiophene with an acylating agent selected from the group consisting of acyl halides and anhydrides of carboxylic acids in the presence of an activated glauconite as a catalyst.

4. A process for nuclear acylation of a thiophene comprising reacting a thiophene with an acylating agent selected from the group consisting of acyl halides and anhydrides of carboxylic acids in the presence of from about 4 to about 25 per cent by weight of glauconite.

5. A process for nuclear acylation of a thiophene comprising reacting a thiophene with a carboxylic acid anhydride in the presence of glauconite as a catalyst.

6. A process for nuclear acylation of a thiophene comprising reacting a thiophene with an acyl halide in the presence of glauconite as a catalyst.

7. A process for nuclear acylation of thiophene reacting thiophene with a fatty acid anhydride in the presence of glauconite as a catalyst.

8. A process for nuclear acylation of thiophene reacting thiophene with acetic anhydride in the presence of glauconite as a catalyst.

9. A process for nuclear acylation of a thiophene comprising reacting a thiophene with benzoyl chloride in the presence of glauconite as a catalyst.

10. A process for nuclear acylation of a thiophene comprising reacting a thiophene with an acylating agent selected from the group consisting of acyl halides and anhydrides of carboxylic acids in the presence of from about 4 to about 25 per cent by weight of glauconite at a temperature between about 80° C. and about 150° C. for a period of from about 1 to about 10 hours.

11. A process for nuclear acylation of a thiophene comprising reacting a thiophene with an acyl halide in the presence of from about 4 to about 25 per cent by weight of glauconite.

12. A process for nuclear acylation of a thiophene comprising reacting a thiophene with a carboxylic acid anhydride in the presence of from about 4 to about 25 per cent by weight of glauconite.

HOWARD D. HARTOUGH.
JOHN J. SARDELLA.